(12) United States Patent
Stepanov et al.

(10) Patent No.: US 6,181,546 B1
(45) Date of Patent: *Jan. 30, 2001

(54) DOUBLE LAYER CAPACITOR

(75) Inventors: Aleksei B. Stepanov; Igor N. Varakin; Vladimir V. Menukhov, all of Saratov; Arkadi D. Klementov, Moscow Region, all of (RU)

(73) Assignee: Aktsionernoe Obschestvo Zakrytogo Tipa "Elton", Moscow (RU)

( * ) Notice: Under 35 U.S.C. 154(b), the term of this patent shall be extended for 0 days.

This patent is subject to a terminal disclaimer.

(21) Appl. No.: 09/232,712

(22) Filed: Jan. 19, 1999

Related U.S. Application Data

(63) Continuation-in-part of application No. 08/817,253, filed as application No. PCT/RU95/00171 on Aug. 14, 1995, now Pat. No. 5,986,876.

(51) Int. Cl.[7] ............... H01G 9/00; H01G 9/04
(52) U.S. Cl. ............ 361/502; 361/504; 361/508
(58) Field of Search .................. 361/303, 304, 361/324, 305, 502, 503, 505, 517, 522, 524, 526, 322, 321.1, 508, 509, 518–519; 429/59–62, 209, 210, 213, 235

(56) References Cited

U.S. PATENT DOCUMENTS

| | | |
|---|---|---|
| 3,691,433 | 9/1972 | Garstang ................ 361/524 |
| 4,313,084 | 1/1982 | Hosokawa et al. ........... 361/370 |
| 4,523,255 | 6/1985 | Rogers .................. 361/516 |
| 4,626,964 | 12/1986 | Azuma et al. ............. 361/502 |
| 4,683,516 | 7/1987 | Miller .................. 361/328 |
| 4,697,224 | 9/1987 | Watanabe et al. ........... 361/502 |
| 4,709,303 | * 11/1987 | Fujiwara et al. ........... 361/502 |
| 4,713,731 | 12/1987 | Boos et al. ............... 361/516 |
| 4,737,889 | * 4/1988 | Nishino et al. ............ 361/502 |
| 5,541,019 | 7/1996 | Anani et al. .............. 429/59 |
| 5,986,876 | * 11/1999 | Stepnanov et al. .......... 361/502 |

FOREIGN PATENT DOCUMENTS

| | | |
|---|---|---|
| 32 10 420 | 9/1983 | (DE) . |
| 3801719 | 8/1988 | (DE) . |
| WO84/00246 | 1/1984 | (WO) . |

OTHER PUBLICATIONS

Hahn, G., et al, "Elektrische Doppelschichtkondensatoren fur die Speicherpufferung" *Radio Fernsehen Elektronik*, Berlin 39 (1990), pp. 77–80.

Halliop, Wojtek and John Stannard, "Low Cost Supercapacitors," *Third International Seminar on Double Layer Capacitors and Similar Energy Storage Devices*, Dec. 6–8, 1993 (7 pages).

Sekiso, Satoshi, et al. "Liquid Electrolyte Double–Layer Capacitor 'Gold Capacitor'", *National Technical Report*, vol. 26, No. 2, Apr. 1980, pp. 220–230.

* cited by examiner

*Primary Examiner*—Anthony Dinkins
(74) *Attorney, Agent, or Firm*—McDermott, Will & Emery

(57) ABSTRACT

A capacitor for storing electrical energy using a combination of a negative electrode made of carbon material and a nickel hydroxide positive electrode reacting in electrolyte including an aqueous alkaline solution.

10 Claims, 2 Drawing Sheets

DOUBLE LAYER CAPACITOR

This application is a continuation-in-part application of patent application Ser. No. 08/817,253 filed on Apr. 11, 1997 now U.S. Pat. No. 5,986,876, which was the National Stage of the International Application No. PCT/RU95/00171 filed Aug. 14, 1995.

TECHNICAL FIELD

The present invention relates to electrical engineering and, more specifically to electrical double layer capacitors that can be used in various power supply systems such as power sources for electrical vehicles and means for reliable internal combustion engine starting.

BACKGROUND ART

Double-layer capacitors with liquid electrolyte and electrodes made of various materials having large specific surface are known in the art (e.g. U.S. Pat. No. 4,313,084 of 1982 and FRG Patent 3,210,420 of 1983). Best results are attained when using various activated carbons as the material of electrodes. Specific capacity of such capacitors exceed 2 F/cu.cm, while use of aprotic electrolytes enables their working voltage to be increased up to 2 or 3 V (see U.S. Pat. No. 4,697,224 of 1987; Nat. Tech. Report, 1980, 26 # 2, pp. 220–230).

However, use of carbonic materials and organic solvents ensures against obtaining high power characteristics of double-layer capacitors that are sometimes necessary, due to high internal resistance caused by low conductance of carbon and electrolyte. Increased charge/discharge current values of double-layer capacitors is attained by further improvements in construction of capacitor electrodes due to, e.g., the use of electrically conducting binder additives and of fibrous carbonic materials (see Carbon, 1990, 28 # 4, pp. 477–482; Radio-Fernsehen-Elektron, 1990, 39 # 2, pp. 77–800).

The most closely pertinent to the present invention in terms of its technical essence and the attainable effect is a double-layer capacitor having two polarizable electrodes made of activated carbon fiber (see W. Hallop et al. Low Cost Supercapacitors. Third International Seminar on double-layer capacitors and similar energy storage devices. Florida, 1993).

However, the electrical energy that can be stored by such capacitors are not sufficient for such applications as power sources for electric vehicles.

DISCLOSURE OF THE INVENTION

The present invention provides a novel double layer capacitor which allows a large amount of electric energy to be stored due to combining a polarizable electrode with a non-polarizable electrode.

Conventional double layer capacitors use polarizable electrodes as both positive and negative electrodes. During discharge of a double electric layer capacitor with two polarizable electrodes, potentials at both electrodes change in opposite directions. As a result, the voltage at the capacitor reduces twice as fast as the potential at each of the electrodes. If the capacitances of the electrodes are equal, the capacitance of the capacitor is about half the capacitance of each electrode.

In accordance with the present invention, the double layer capacitor uses a polarizable negative electrode, whereas its positive electrode comprising nickel hydroxide is non-polarizable.

During discharge, potential at the nickel hydroxide electrode remains practically unchanged. Thus, the capacity of the capacitor is approximately equal to the capacity of the polarizable electrode. As a result, the capacity of the present capacitor is nearly twice as large as the capacitance of a conventional capacitor with two polarizable electrodes. Accordingly, energy that may be accumulated by the capacitor of the present invention is substantially larger than the energy of conventional capacitors having two polarizable electrodes.

Moreover, the mass and volume of the nickel hydroxide electrode may be much smaller than the mass and volume of the polarizable electrode having similar characteristics. This allows the specific energy to be further increased.

Also, the use of the nickel hydroxide electrode in a combination with a polarizable electrode allows the maximum voltage of the capacitor to be increased. As a result, the specific energy may be further increased.

In accordance with a first aspect of the invention, a double layer electrical capacitor for storing electrical energy comprises a combination of polarizable electrode and a non-polarizable electrode reacting with each other in an alkaline electrolyte.

In a preferred embodiment of the invention, the polarizable electrode may be made of carbon material, and the non-polarizable electrode may comprise nickel hydroxide as active material. The polarizable electrode and the non-polarizable electrode may react with each other in the electrolyte comprising aqueous solution of a compound selected from the group consisting of alkali metal carbonate, alkali metal hydroxide and compositions thereof.

The carbon material may be metallized by nickel, silver or copper. The polarizable electrode may be provided with a current collector made of copper or silver. Alternatively, the current collector may be made of nickel covered with silver, gold or carbon.

In accordance with another aspect of the present invention, a capacitor-based module for storing electrical energy is composed of a plurality of capacitor cells electrically connected with each other. Each capacitor cell comprises a negative electrode made of carbon material and a nickel hydroxide positive electrode reacting with each other in electrolyte comprising an aqueous solution of a compound selected from the group consisting of alkali metal carbonate, alkali metal hydroxide, and compositions thereof.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

The present invention will be described with the following exemplary embodiments of an electrical double layer capacitor. It will become apparent, however, that the present invention is applicable to any double layer capacitor combining polarizable and non-polarizable electrodes.

EXAMPLE 1

Figure 1:
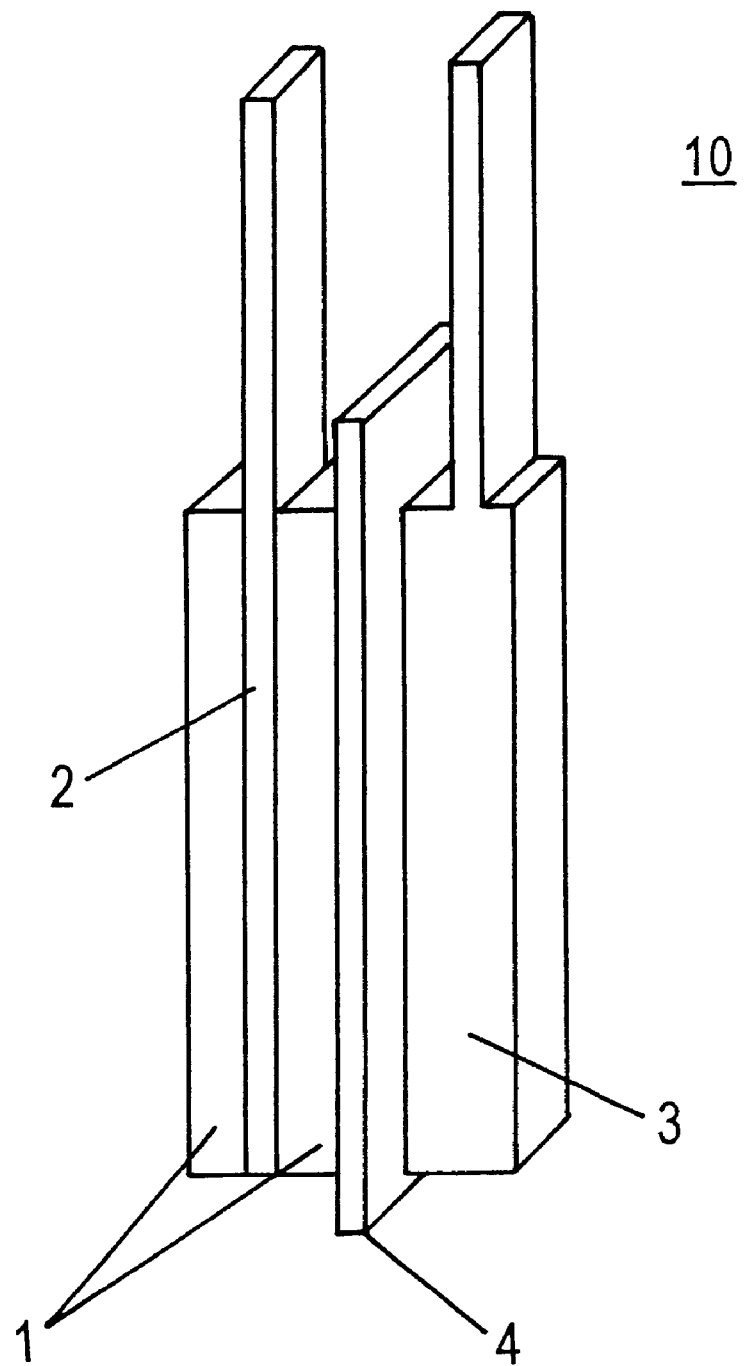
FIG. 1 illustrates the structure of the double layer capacitor of the present invention.

As shown in FIG. 1, an electrical double layer capacitor 10 according to a first embodiment of the present invention comprises a polarizable negative electrode 1 which may be made of carbon sheets having thickness of 0.35 mm and specific surface of 900–2000 sq.m/g. A current collector 2 provided between the carbon sheets may be made of perforated nickel foil having thickness of 0.05 mm. Alternatively, the current collector 2 may be made of copper, silver, or gold- or silver-plated nickel. The use of copper, silver or gold- or silver-plated nickel for the current collector 2 allows the operating voltage of the capacitor to be substantially increased compared with the capacitor having the current collector made of nickel foil. As a result, the specific energy of the capacitor can be increased.

Also, the capacitor 10 comprises a non-polarizable positive electrode 3, which may include nickel hydroxide as the active material. Baked nickel may be used as conductive base supporting the active material.

During discharge, the charged nickel hydroxide NiOOH goes to a lower valence state, $Ni(OH)_2$ by accepting electrons. The thickness of the nickel hydroxide positive electrode 3 may be equal to 0.35 mm. The specific capacity of the electrode 3 may be equal to 0.4 $Ah/cm^3$. The electrolyte in which the reaction occurs may be potassium hydroxide solution in water at concentration of about 6 mole/l. A separator 4 provided between the electrodes 1 and 3 may be made of a nylon sheet having thickness of 0.2 mm. To provide a capacitor cell, the electrodes may be arranged in a hermetically sealed container having size, for example, about 50×24×11 mm.

As discussed above, conventional double layer capacitors use polarizable electrodes as both positive and negative electrodes. During discharge of a double electric layer capacitor with two polarizable electrodes, potentials at both electrodes change in opposite directions. As a result, the voltage at the capacitor reduces twice as fast as the potential at each of the electrodes. If the capacitances of the electrodes are equal, the capacitance of the capacitor is about half the capacitance of each electrode In accordance with the present invention, the double layer capacitor uses a polarizable negative electrode, whereas its positive electrode comprises nickel hydroxide is non-polarizable.

During discharge, potential at the nickel hydroxide electrode remains practically unchanged. Thus, the capacity of the capacitor is approximately equal to the capacity of the polarizable electrode. As a result, the capacity of the present capacitor is near twice as large as the capacitance of a conventional capacitor with two polarizable electrodes. Accordingly, energy that may be accumulated by the capacitor of the present invention is substantially larger than the energy of conventional capacitors.

Moreover, the mass and volume of the nickel hydroxide electrode may be much smaller than the mass and volume of the polarizable electrode having similar characteristics. This allows the specific energy to be further increased.

Also, the use of the nickel hydroxide electrode in a combination with a polarizable electrode allows the maximum voltage of the capacitor to be increased. As a result, the energy may be further increased.

EXAMPLE 2

In accordance with a second embodiment of the present invention, a double layer capacitor differs from the capacitor 10 of the first embodiment only in that the negative electrode 1 is made of carbon sheets metallized by nickel so as to have the content of the nickel about 20% by weight of the electrode. The size of the container for the capacitor cell of the second embodiment may be about 50×12×11 mm.

EXAMPLE 3

A double layer capacitor in accordance with a third embodiment of the present invention differs from the capacitor 10 of the first embodiment only in that the negative electrode 1 is made of carbon sheets metallized by copper so as to have the content of the copper about 10% by weight of the electrode.

EXAMPLE 4

A double layer capacitor in accordance with a fourth embodiment of the present invention differs from the capacitor 10 of the first embodiment in that the negative electrode 1 is made of carbon sheets metallized by silver so as to have the content of the silver about 7% by weight of the electrode. The electrolyte may be potassium carbonate solution in water at concentration of about 3 mole/l.

EXAMPLE 5

A double layer capacitor in accordance with a fifth embodiment of the present invention differs from the capacitor 10 of the first embodiment in that the negative electrode 1 having the thickness of 0.5 mm is made of carbon powder with bonding material. The specific surface of the powder may be in the range about 1000–1200 $m^2/g$. Also, the current collector 2 may be made of perforated copper foil having thickness of 0.05 mm. Further, the container may be provided with a relief valve for reducing the excessive pressure operating in the range about 0.3–1.0 atm.

EXAMPLE 6

A double layer capacitor in accordance with a sixth embodiment of the present invention differs from the capacitor 10 of the first embodiment in that the negative electrode 1 having the thickness of 1.0 mm is made of carbon powder with bonding material. The specific surface of the powder may be in the range about 1000–1200 $m^2/g$. The current collector 2 may be made of perforated nickel foil having thickness of 0.05 mm. The nickel foil may be covered with a silver film having the thickness of 0.5 micrometers.

The positive nickel hydroxide electrode 3 may contain polymeric felt metallized by nickel as conducting base supporting the active material. The thickness of the positive electrode may be about 0.5 mm. The container may be provided with a relief valve for reducing the excessive pressure operating in the range about 0.3–1.0 atm.

CAPACITOR-BASED MODULES

Figure 2:
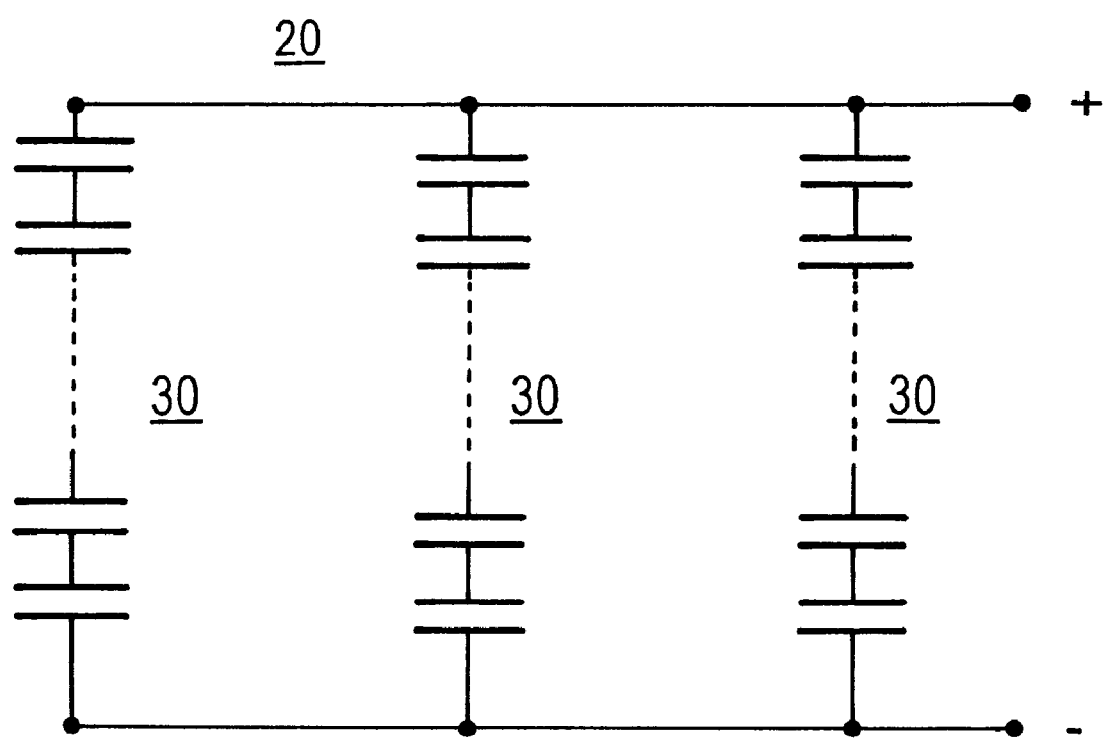
FIG. 2 is a circuit diagram illustrating a capacitor-based module of the present invention.

The double layer capacitors of the present invention may be connected with each other to provide a capacitor-based module 20. FIG. 2 shows a circuit diagram of an exemplary capacitor-based module of the present invention, which consists of three capacitor blocks 30 connected in parallel. Each of the capacitor blocks 30 may comprise about 100 double layer capacitors of the present invention connected in series. For example, the double layer capacitors 10 of the first embodiment may be used in the capacitor-based module 20.

The capacitor-based module 20 of the present invention can be used in various applications such as permanent and emergency power supply systems, power sources for electric vehicles, means for internal combustion engine starting, etc.

As discussed above, the energy stored by the double layer capacitor of the present invention is much higher that the energy stored by conventional double layer capacitors. For example, the specific electrical energy stored by the double layer capacitor of the sixth embodiment can be about 133 $J/cm^3$, whereas the specific electric energy stored by a conventional double layer capacitor is about 4 $J/cm^3$.

In this disclosure, there are shown and described only the preferred embodiments of the invention, but it is to be understood that the invention is capable of changes and modifications within the scope of the inventive concept as expressed herein.

What is claimed is:

1. A double layer electrical capacitor for storing electrical energy, comprising a combination of polarizable electrode and a non-polarizable electrode reacting with each other in an alkaline electrolyte.

2. The capacitor of claim 1, wherein the polarizable electrode is made of carbon material.

3. The capacitor of claim 2, wherein the non-polarizable electrode comprises nickel hydroxide as active material.

4. The capacitor of claim 3, wherein the alkaline electrolyte comprises an aqueous solution of a compound selected from the group consisting of alkali metal carbonate, alkali metal hydroxide and compositions thereof.

5. The capacitor of claim 2, wherein the carbon material is metallized by a metal selected from the group consisting of nickel, silver and copper.

6. The capacitor of claim 2, wherein the polarizable electrode is provided with a current collector made of copper.

7. The capacitor of claim 2, wherein the polarizable electrode is provided with a current collector made of silver.

8. The capacitor of claim 2, wherein the polarizable electrode is provided with a current collector made of nickel covered with a metal selected from the group consisting of silver, gold and carbon.

9. A capacitor-based module for storing electrical energy, composed of a plurality of capacitor cells electrically connected with each other, wherein each capacitor cell comprises a negative electrode made of carbon material and a nickel hydroxide positive electrode reacting with each other in electrolyte comprising an aqueous solution of a compound selected from the group consisting of alkali metal carbonate, alkali metal hydroxide and compositions thereof.

10. A capacitor comprising a combination of a negative electrode made of carbon material and a nickel hydroxide positive electrode reacting in electrolyte comprising an aqueous solution of a compound selected from the group consisting of alkali metal carbonate, alkali metal hydroxide and compositions thereof.

* * * * *